United States Patent
Nakashima et al.

(10) Patent No.: US 10,245,692 B2
(45) Date of Patent: Apr. 2, 2019

(54) CHAIN-TYPE TOOL MAGAZINE

(71) Applicant: MAKINO MILLING MACHINE CO., LTD., Tokyo (JP)

(72) Inventors: Toru Nakashima, Minamitsuru-gun (JP); Naohiro Hayashi, Minamitsuru-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 323 days.

(21) Appl. No.: 15/034,438

(22) PCT Filed: Nov. 8, 2013

(86) PCT No.: PCT/JP2013/080297
§ 371 (c)(1),
(2) Date: May 4, 2016

(87) PCT Pub. No.: WO2015/068278
PCT Pub. Date: May 14, 2015

(65) Prior Publication Data
US 2016/0271746 A1 Sep. 22, 2016

(51) Int. Cl.
*B23Q 3/157* (2006.01)
*B23Q 3/155* (2006.01)

(52) U.S. Cl.
CPC ..... *B23Q 3/15526* (2013.01); *B23Q 3/15713* (2013.01); *B23Q 3/15724* (2016.11); *B23Q 3/15766* (2013.01); *Y10T 483/1891* (2015.01)

(58) Field of Classification Search
CPC ............ B23Q 3/15526; B23Q 3/15532; B23Q 3/1572; B23Q 3/15724; B23Q 3/15766; Y10T 483/1891
See application file for complete search history.

(56) References Cited

U.S. PATENT DOCUMENTS 4,699,276 A * 10/1987 Kis ................... B23Q 3/15526
211/1.56
8,632,447 B2 * 1/2014 Sun ..................... B23Q 3/1572
483/3
(Continued)

FOREIGN PATENT DOCUMENTS

CN  102029542         4/2011
DE    3431091 A1 *   3/1986   ......... B23Q 3/15526
(Continued)

OTHER PUBLICATIONS

International Search Report dated Feb. 10, 2014, directed to International Application No. PCT/JP2013/080297; 2 pages.

*Primary Examiner* — Daniel Howell
(74) *Attorney, Agent, or Firm* — Morrison & Foerster LLP

(57) ABSTRACT

A chain-type tool magazine for detachably holding a plurality of pots on a chain and circulating the pots, provided with: U-shaped link members having openings for detachably holding pots, the link members having first rollers protruding on the side of the openings and second rollers on the side opposite from the opening; link members which do not have a roller; a chain assembly in which the plurality of link members are alternately joined by pins in an endless manner; guides for guiding the first rollers and the second rollers so that the chain assembly bends in the forward and reverse directions and circulates in a meandering manner; and driving means for circularly driving the chain assembly.

9 Claims, 19 Drawing Sheets

(56) References Cited

U.S. PATENT DOCUMENTS

| | | | | |
|---|---|---|---|---|
| 9,005,092 B2 * | 4/2015 | Kim | .................. | B23Q 3/15526 |
| | | | | 211/1.56 |
| 2011/0251035 A1 | 10/2011 | Tüllmann et al. | | |
| 2016/0221137 A1 * | 8/2016 | Tullmann | ............. | B23Q 3/1572 |
| 2017/0057032 A1 * | 3/2017 | Carson | ............... | B23Q 3/15724 |

FOREIGN PATENT DOCUMENTS

| | | | | |
|---|---|---|---|---|
| DE | 19609145 A1 * | 9/1997 | ......... | B23Q 3/15533 |
| DE | 102004028575 A1 * | 1/2006 | ......... | B23Q 3/15526 |
| JP | 63-179037 | 11/1988 | | |
| JP | 2-53332 | 4/1990 | | |
| JP | 5-93736 | 12/1993 | | |
| JP | 6-7871 | 2/1994 | | |
| JP | 11077466 A * | 3/1999 | | |
| JP | 2003-275934 | 9/2003 | | |
| JP | 4120863 | 5/2008 | | |
| JP | 2011-79128 | 4/2011 | | |
| WO | WO 2007048809 A1 * | 5/2007 | ......... | B23Q 3/15526 |

\* cited by examiner

CHAIN-TYPE TOOL MAGAZINE

CROSS-REFERENCE TO RELATED APPLICATIONS

This application is a U.S. National Stage patent application of International Patent Application No. PCT/JP2013/080297, filed Nov. 8, 2013, which is hereby incorporated by reference in the present disclosure in its entirety.

FIELD OF THE INVENTION

The invention relates to a chain-type tool magazine for storing a plurality of tools adapted to be used in a machining center etc.

BACKGROUND OF THE INVENTION

A tool magazine, disposed adjacent to a machine tool and adapted to store a plurality of tools and select one from the stored tools in accordance with a machining program so as to advantageously supply it to the machine tool. For example, PLTs 1 and 2 describes chain-type tool magazines.

PLT 1 describes a separate chain-type tool magazine which allows the tools to be removed, along with pots holding the tools, from the chain. This chain-type tool magazine allows the chain to run along a traveling route having concave and convex parts so as to increase the volume efficiency of the tool magazine. PLT 2 describes a chain-type tool magazine which comprises an endless chain with two rhombus plates which are disposed apart from each other in the axial direction of a pot and connected by a pin.

PATENT LITERATURE

PLT 1: Japanese Patent No. 4120863 B
PLT 2: Japanese Examined Patent Publication No. H06-007871 B

SUMMARY OF THE INVENTION

According to the chain of PLT 1, the radius of curvature of the circulating track at a curved part curved into a recessed shape must be increased in order to prevent the plates from interfering with each other due to the generally recessed shape of the plates, and therefore in the tool magazine of PLT 1, the volumetric efficiency or space saving effect is insufficient.

The chain of PLT 2 can run along a serpentine track within a small space because the movable range at the connections is relatively wide. However, pots cannot be removed from the chain, and therefore, the tools must be moved in the axial direction in order to be attached to or removed from the chain, resulting in increase in the complexity of a tool transferring device (shifter), further resulting in increase in the manufacturing cost and increase in the time for preparing tools.

Further, according to the tool magazines of PLTs 1 and 2, when heavy tools or long tools are attached to the chain, the chain is warped whereby the tools are inclined so that their fronts are lowered, resulting in generation of vibrations of the chain or falling of the tools due to the vibrations of the chain. Thus, the driving speed of the chain must be reduced.

Further, in the tool magazines described in PLTs 1 and 2, sprockets are used for driving the chains. The relative positions of engagement between the chain and the sprockets are changed during the rotation of the sprockets. Therefore, there is a problem accompanied with the configuration that the running speeds of the chains are not constant, which results in generation of vibrations. Furthermore, in the tool magazines of PLTs 1 and 2, sprockets having relatively small diameters are used for the curved portions of the circulating tracks, and therefore the contacting areas between the chains and the sprockets are relatively small, increasing the contacting pressures.

The invention is directed to solve the above-described problems of the prior art, and the objective of the invention is to provide a chain-type tool magazine which allows the tool preparing operation, i.e., removing tools from the tool magazine and loading tools into the tool magazine, to be carried out in a short time, and also to provide a chain-type tool magazine which has a high density of tools stored, and can store more tools in the tool magazine.

In order to solve the above-described problem, the invention provides a chain-type tool magazine including a circulating chain, for removably holding a plurality of pots, to which the tools are attached, or a plurality of tools, the tool magazine comprises, link members each has an opening for removably holding the pot or the tool, first rollers provided at the opening side and second rollers provided opposite side to the opening, an endless chain formed by coupling a plurality of the link members, a guide for guiding the first rollers and second rollers to allow the chain to circulate along a serpentine track having turns to one side and to the opposite side, and drive means for driving the chain to circulate.

According to the invention, the configuration for supporting the chain relative to the guide by the first rollers disposed at the opening of the link member, and the second rollers disposed at the opposite side to the opening, allows the chain to bend in both the left and right directions relative to the running direction, enabling the tool magazine to increase the tool storing density. Further, the openings defined in the chain allows the tools to be removed from the chain without moving the tools in the axial direction, whereby the time for preparing the tools can be reduced. Furthermore, the configuration for supporting the chain relative to the guide by the first and second rollers prevents the chain from being warped whereby the tools are inclined so that their fronts are lowered, by heavy tools or long tools attached to the chain, enabling the chain to run at high speed.

DETAILED DESCRIPTION OF THE INVENTION

With reference to the drawings, a first embodiment of the invention will be described below.

Figure 1:
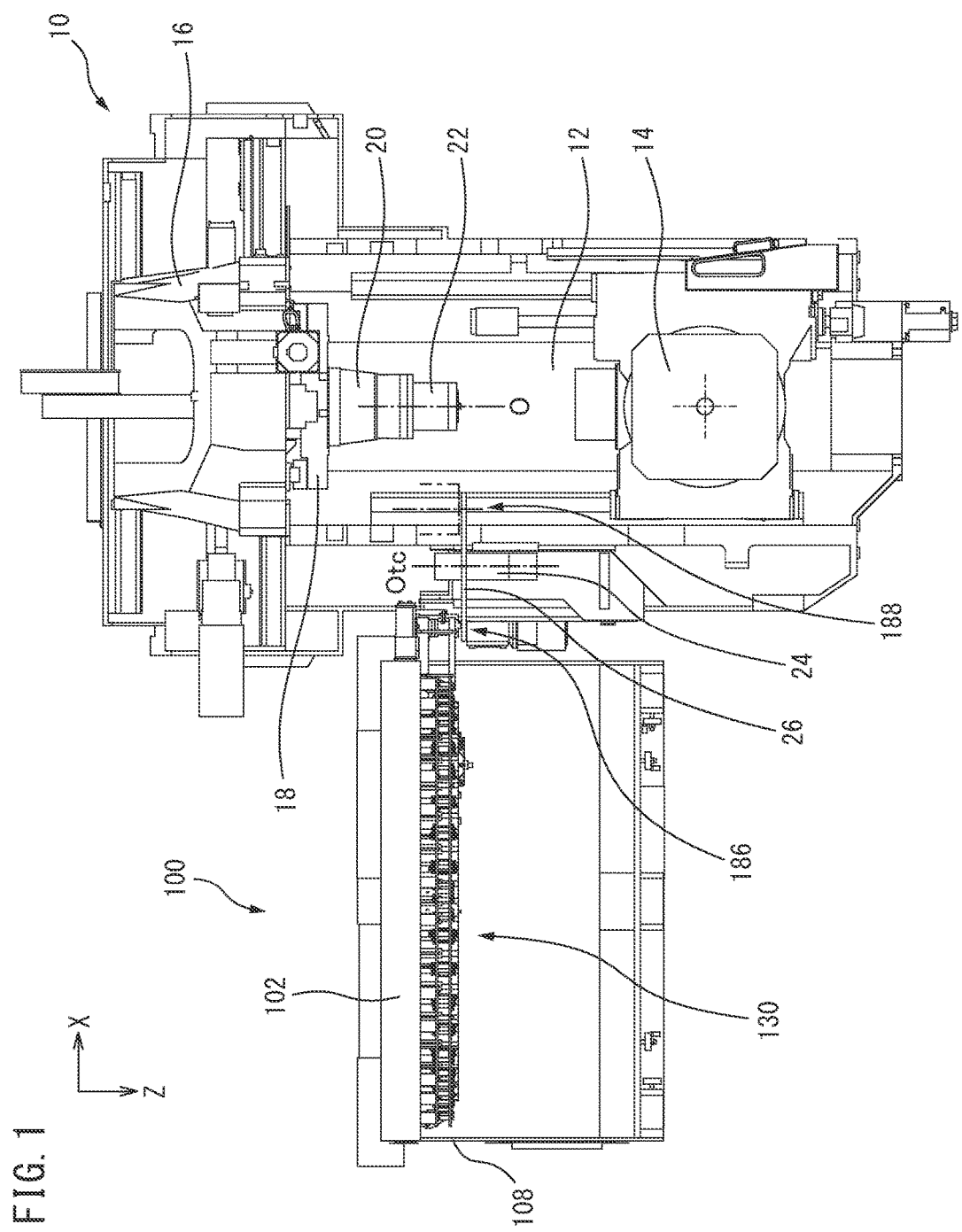
FIG. 1 is a plan view of a chain-type tool magazine according to a first embodiment of the invention.

In FIG. 1, a tool magazine 100 according to the first embodiment of the invention is disposed at one side of a machine tool 10. The machine tool 10 forms a horizontal machining center, comprising a bed 12 providing a base, table 14 mounted to a top face of the bed 12 at the front part thereof for moving horizontally in Z-axis direction (up-and-down direction in FIG. 1), a column 16 mounted to the top face of the bed 12 at the rear side thereof opposite to the table 14 for moving horizontally in X-axis direction (left-and-right direction in FIG. 1), a headstock 18 mounted to a front face of the column 15 for moving vertically in Y-axis direction (perpendicular to the plane of FIG. 1) and a spindle head 20 mounted to the headstock 18 for rotationally supporting a spindle 22 about a horizontal axis O. A tool changer 24 is disposed between the machine tool and the tool magazine 100. The tool changer 24 has a changing arm 24 rotatable about a rotational axis $O_{tc}$ extending in the Z-axis direction.

The tool magazine 100 comprises a base part 104 secured to a floor, a back support part 102 vertically upwardly extending from the base part 104, outer and inner guide rails 110 and 120 mounted to the back support part 102 in the form of a plate, a chain assembly extending between the outer guide rail 110 and the inner guide rail 120, a cam shaft (gear cam) 160 in the form of a screw as a drive unit for driving the chain assembly along the outer guide rail 110 and the inner guide rail 120, a drive motor 162 for driving the cam shaft 160, a shifter 170 for transferring a tool between the tool changer and the chain assembly 130 and a cover 108 for covering the above described elements.

Figure 2:
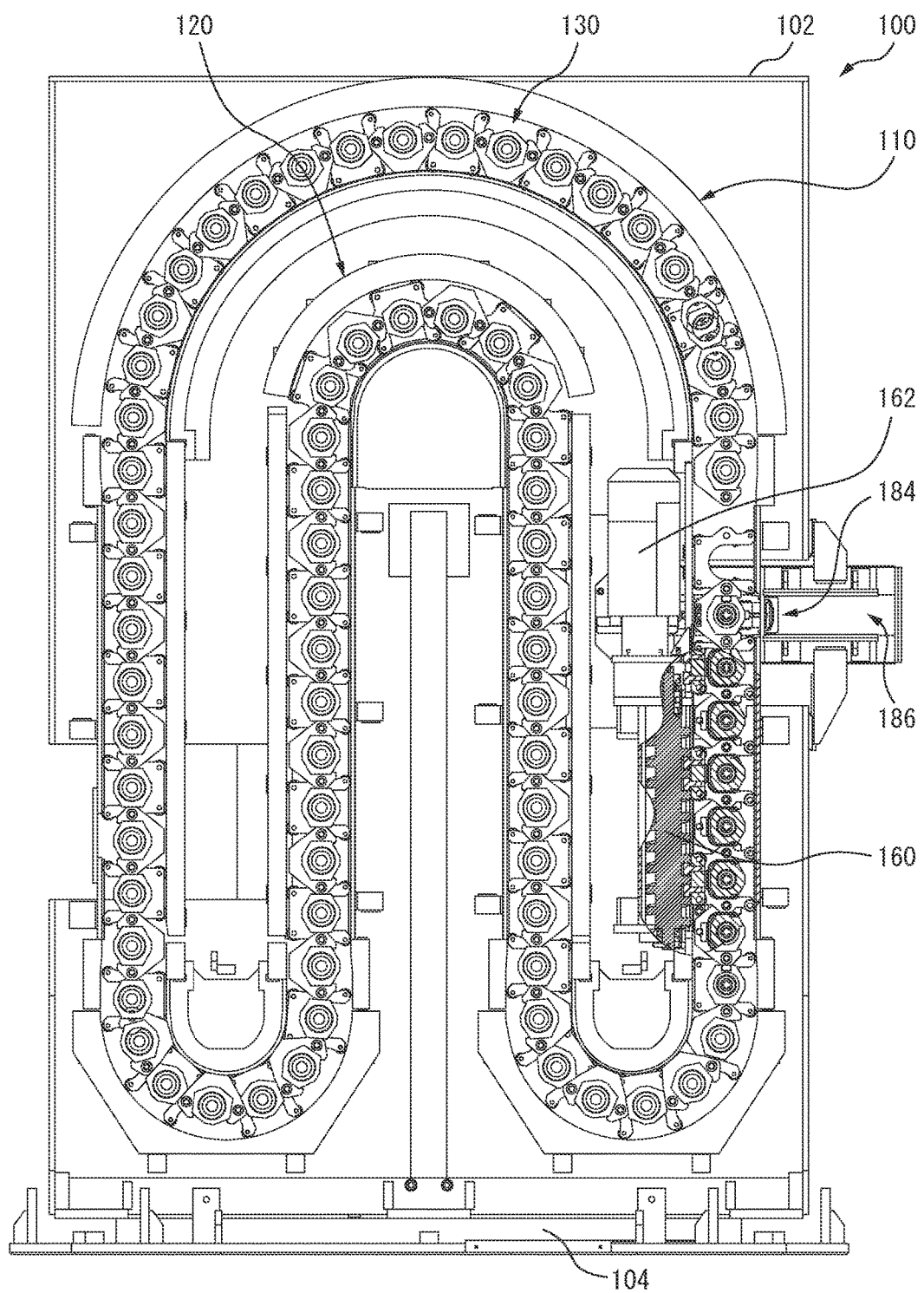
FIG. 2 is a front view of the chain-type tool magazine of FIG. 1 with a cover of the chain-type tool magazine being eliminated.
Figure 3:
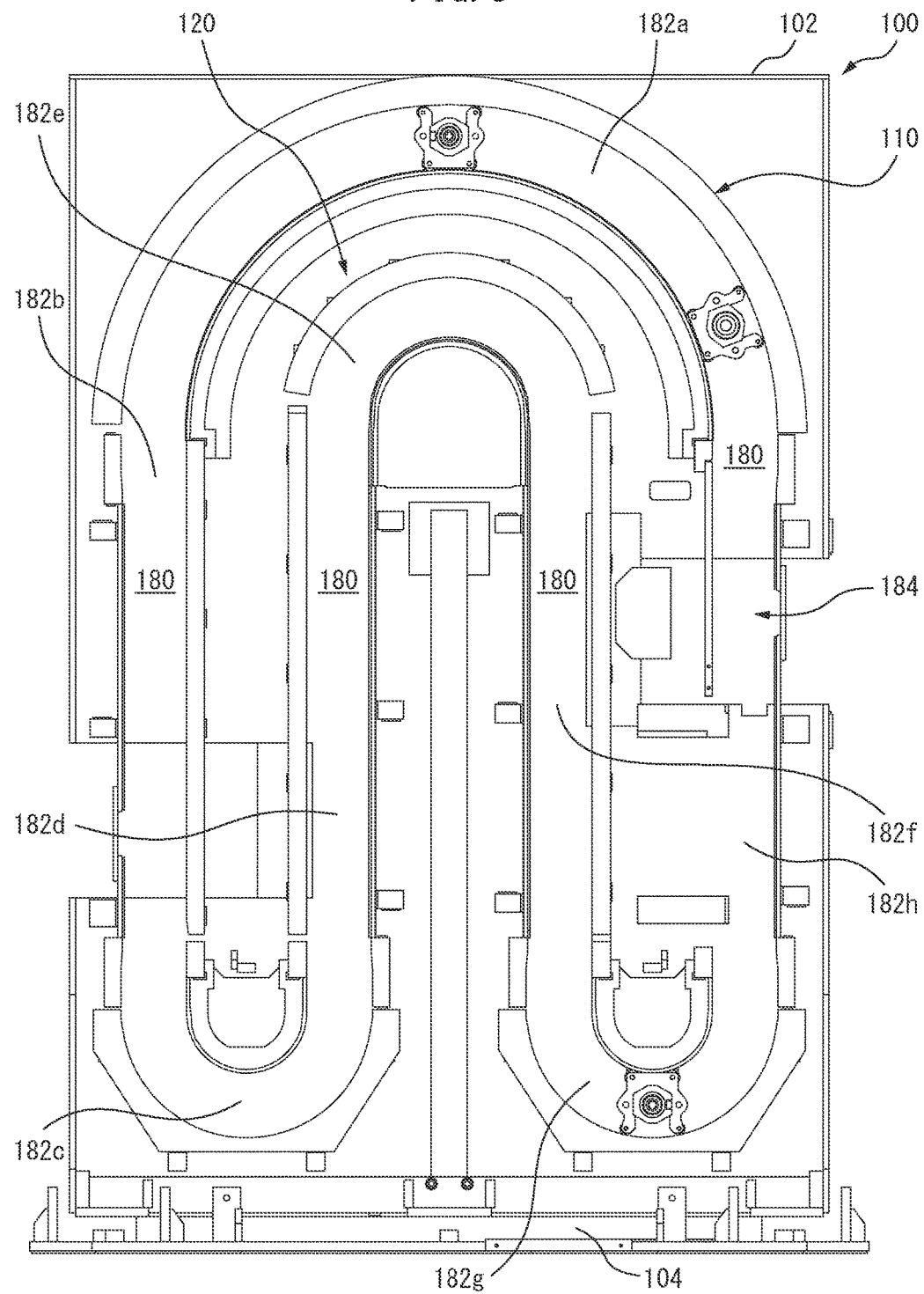
FIG. 3 is a front view of the chain-type tool magazine of FIG. 2 with a chain assembly being eliminated in order to show outer and inner guide rails clearly.
Figure 4:
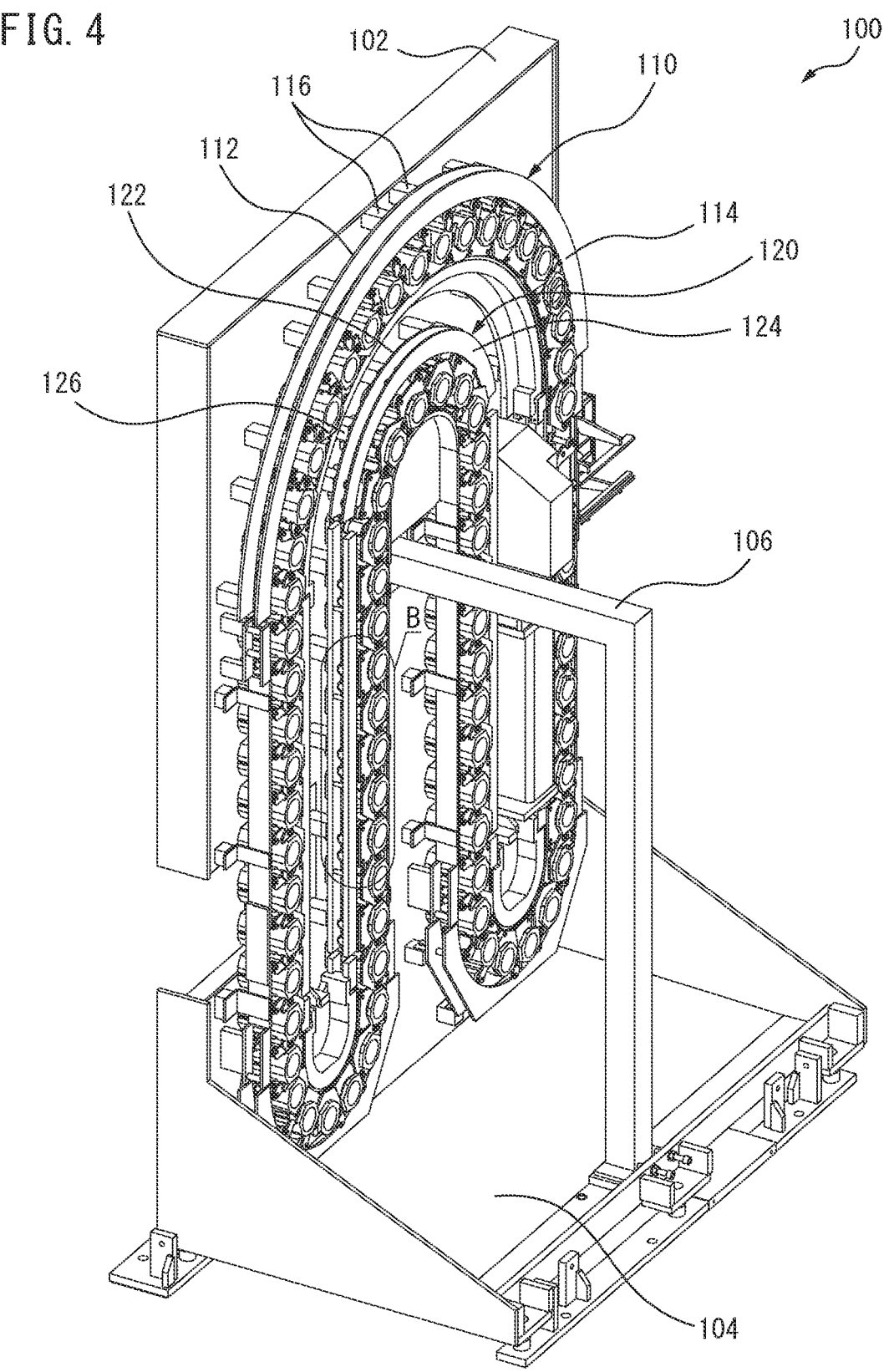
FIG. 4 is a perspective view of the chain-type tool magazine of FIG. 2.

The outer guide rail 110 and the inner guide rail 120 are disposed apart from each other by a predetermined distance so as to extend parallel to each other, whereby a circulating track in the form of an inverted U shape is defined for the chain assembly 130. In particular, as shown in FIG. 2, the circulating track 180 for the chain assembly 130 has a large arc part 182 in the form of a semicircular provided at the highest position, a first linear part 182b extending linearly downwardly from one end of the large arc part 182a, a first small arc part 182c in the form of a semicircular connected to the lower end of the first linear part 182b and provided at the lowest position, a second linear part 182d extending linearly upwardly from the first small arc part 182c, a second small arc part 182e in the form of a semicircular connected to the upper end of the second linear part 182d and provided inside the large arc part 182, a third linear part 182f extending linearly downwardly from the second small arc part 182e, a third small arc part 182g in the form of a semicircular connected to the lower end of the third linear part 182f and provided at substantially the same level as the first small arc part 182c and a fourth linear part 182h extending linearly upwardly from the third small arc 182g to the large arc part 182a. In this embodiment, the cam shaft engages the chain assembly 130 at the fourth linear part 182h.

The outer guide rail 110 comprises first and second guide rails 112 and 114 disposed apart from each other by a distance in the direction perpendicular to the back support part 102. The first guide rail 112 of the outer guide rail 110 is mounted via base pieces 116 at a predetermined distance relative to the back support part 102. The second guide rail 114 is mounted via spacer pins (not shown) at a predetermined distance relative to the first guide rail 112.

The inner guide rail 120 comprises first and second guide rails 122 and 124 disposed apart from each other by a distance in the direction perpendicular to the back support part 102. Each of the first and second guide rails is formed by a plurality of rail segments. The first guide rail 122 of the inner guide rail 120 is mounted via base pieces 126 at a predetermined distance relative to the back support part 102. The second guide rail 124 is mounted via spacer pins (not shown) at a predetermined distance relative to the first guide rail 122.

The chain assembly 130 comprises an endless chain formed of first link members 132 and second link members 148 connected to each other by connecting pins 154. The first line member 132 comprises parallel two link plates 134, which have the same shape, and a block disposed between the two link plates 134. The link plates 134 are secured to each other so as to be apart from each other by the block 136 and pins 140. The link plates 134 are U-shaped plate members each having a base portion 134a secured to the block 136 and a pair of arm portions 134b extending from the base portion 134a. An opening 134 adapted to receive a pot TP is formed between the pair of arm portions 134b. The first link member 132 has four distal rollers 142, providing first rollers, mounted to the arm portions 134b at the ends thereof and four proximal rollers 138, providing second rollers, mounted between the corners of the base portions 134a and the block 136. Further, two cam followers 144, adapted to engage the cam shaft 150, are mounted to the back face of the block 136. The two cam followers 144 are disposed apart from each other in the direction of the movement of the first link member 134 by a distance the same as the pitch of the cam shaft 160 in the form of a screw.

Figure 6:
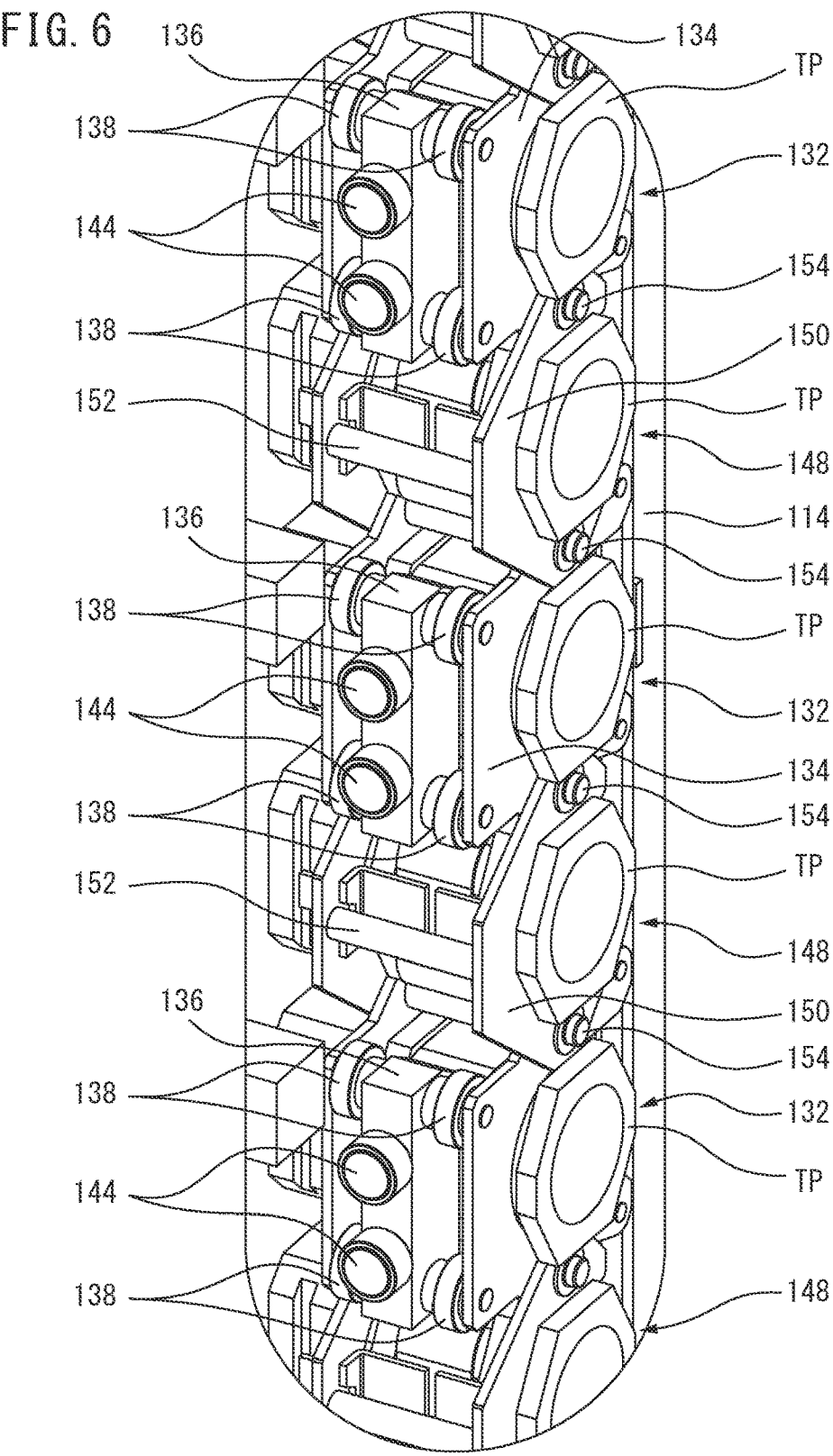
FIG. 6 is a partial perspective view of the chain assembly similar to FIG. 5 from which the inner guide rail is eliminated.
Figure 7:
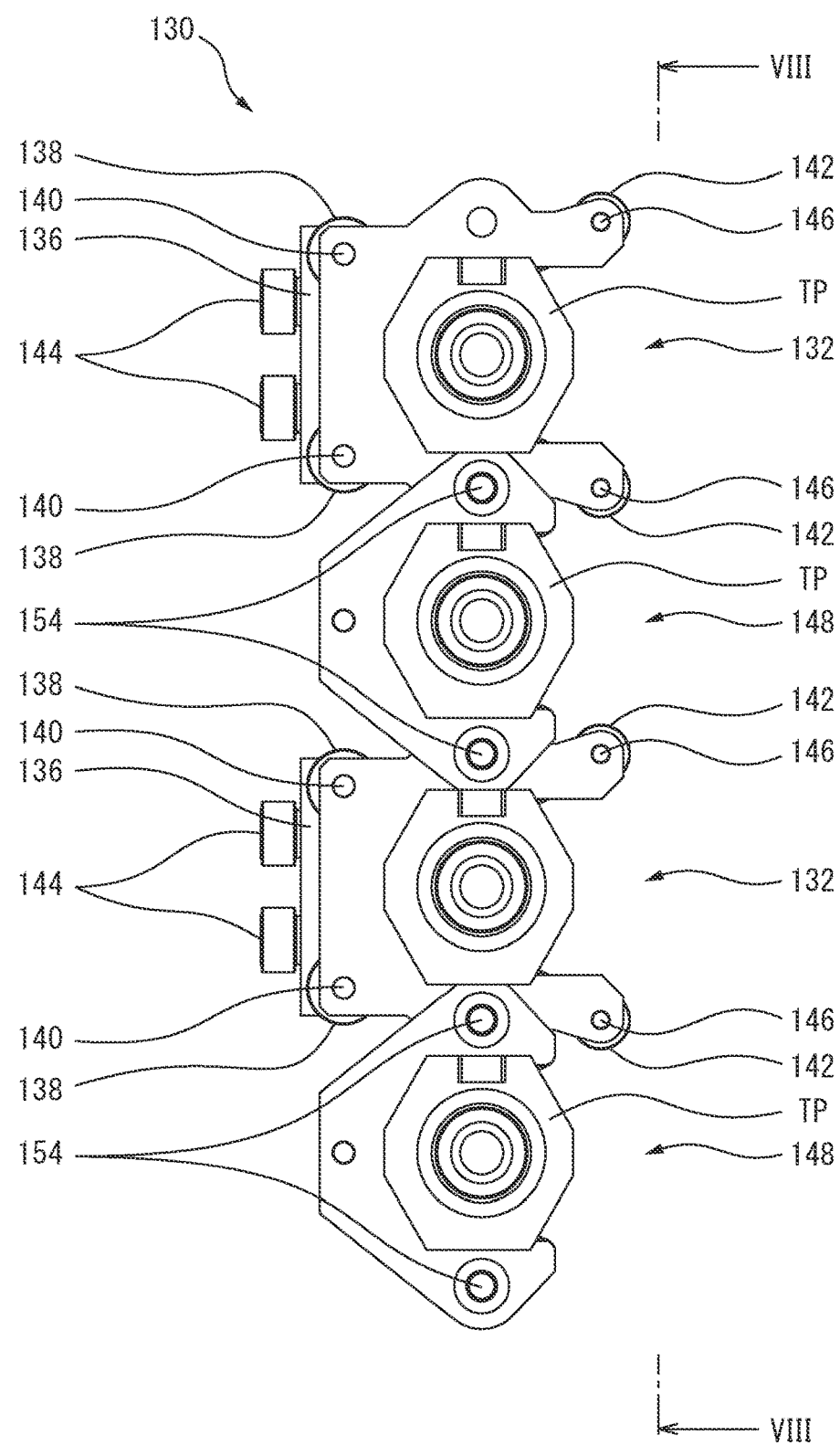
FIG. 7 is a front view showing a portion of the chain assembly.
Figure 8:
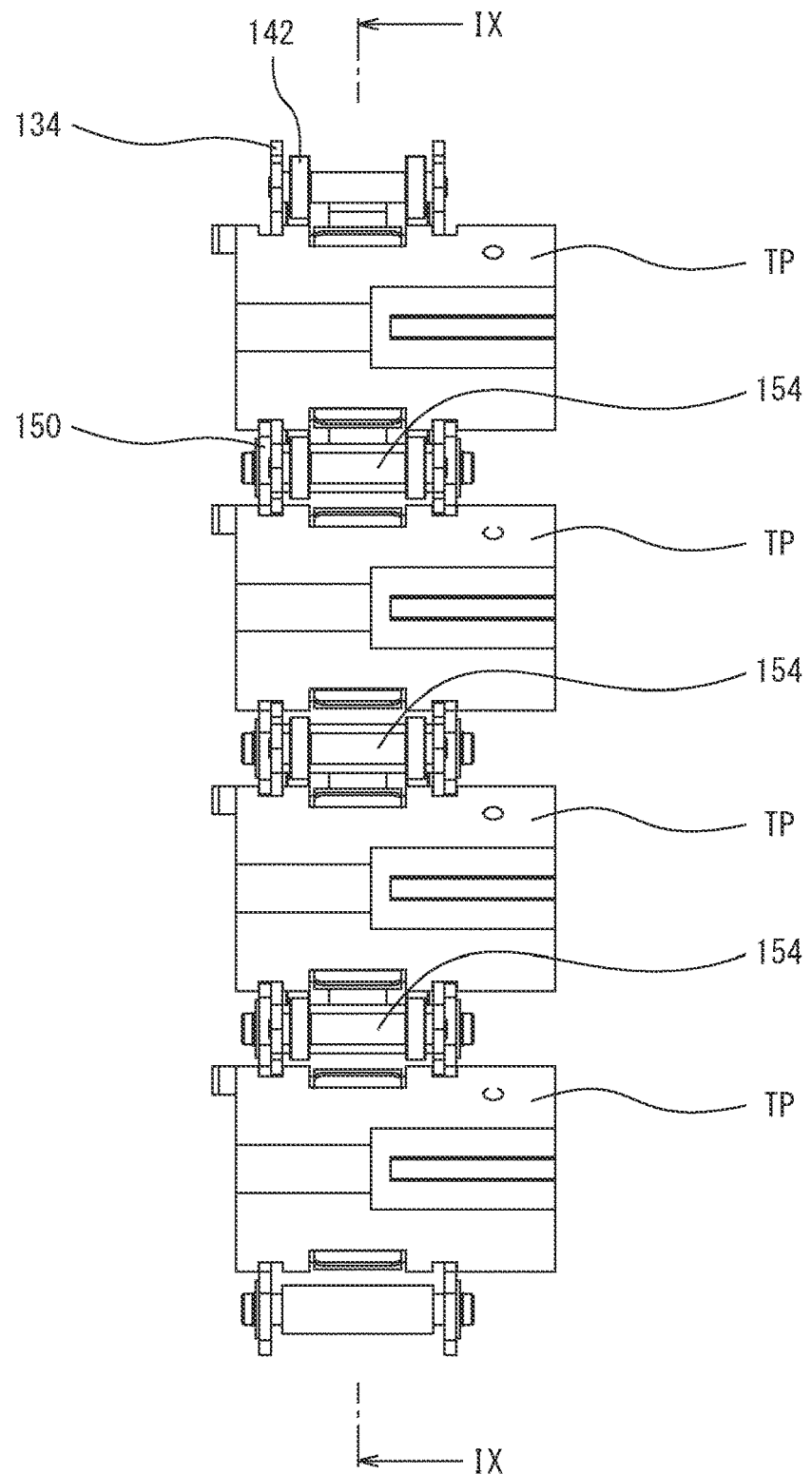
FIG. 8 is a partial side view of the chain assembly viewing in the direction of arrows VIII-VIII in FIG. 7.
Figure 9:
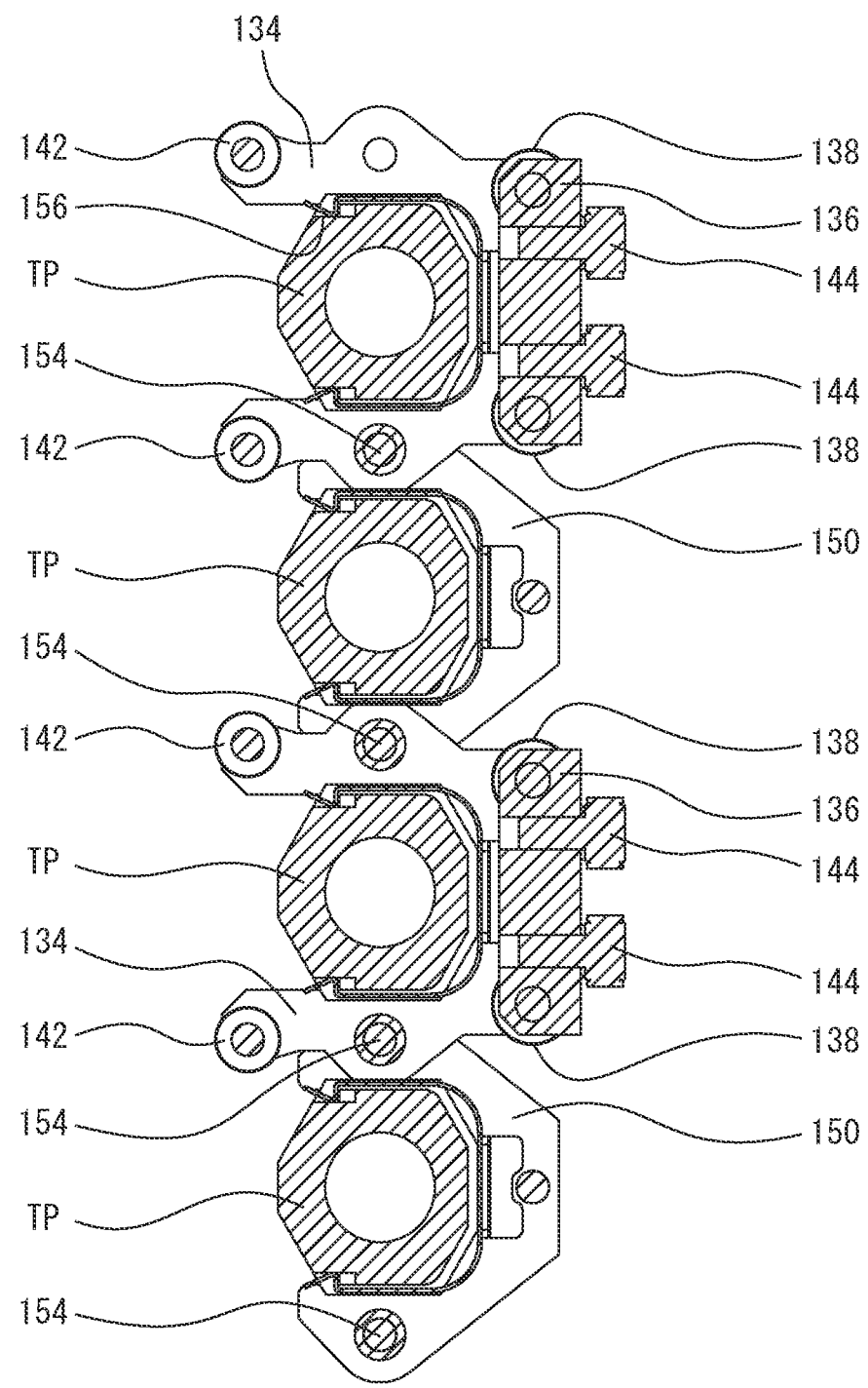
FIG. 9 is a section along line IX-IX in FIG. 8.
Figure 10:
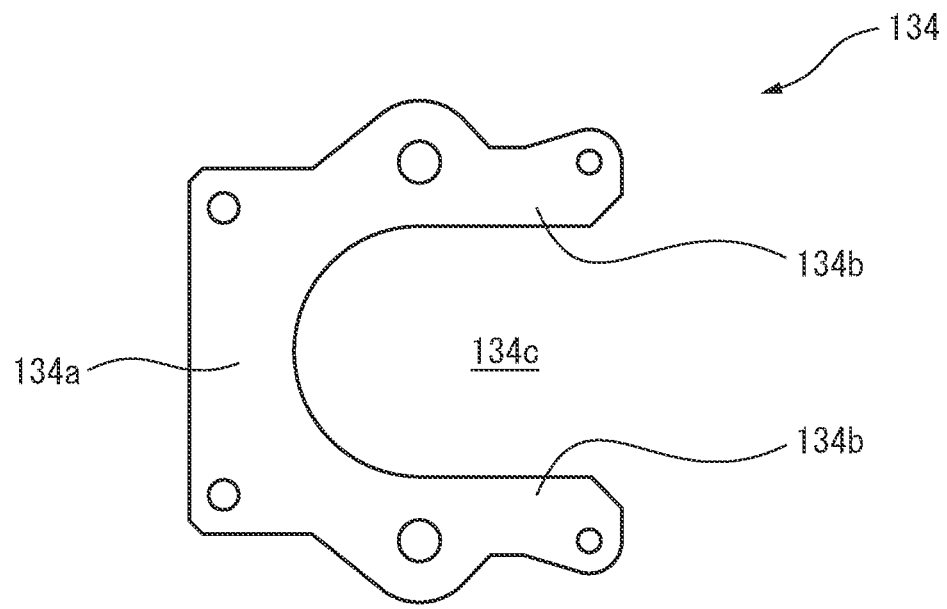
FIG. 10 is a plan view of a link plate of a first link member.
Figure 11:
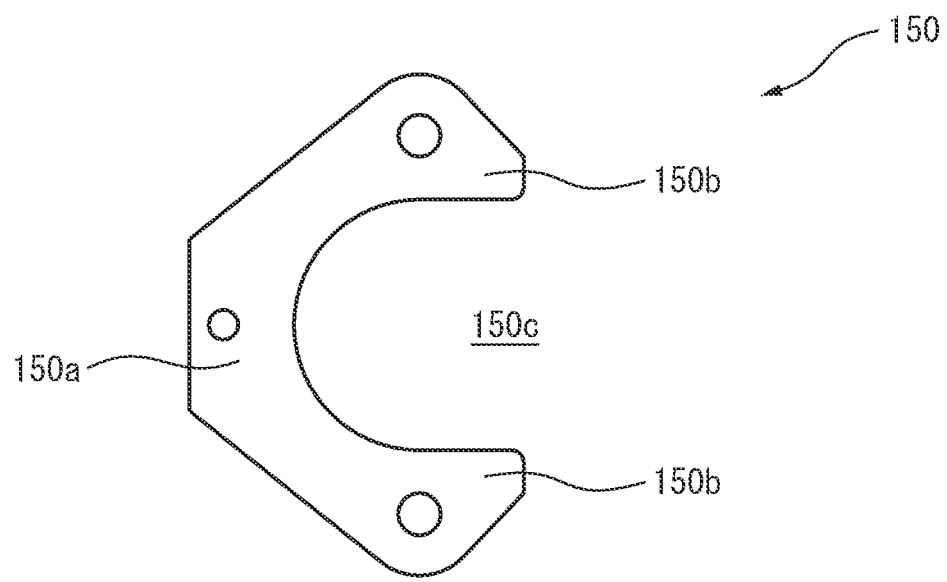
FIG. 11 is a plan view of a link plate of a second link member.
Figure 12:
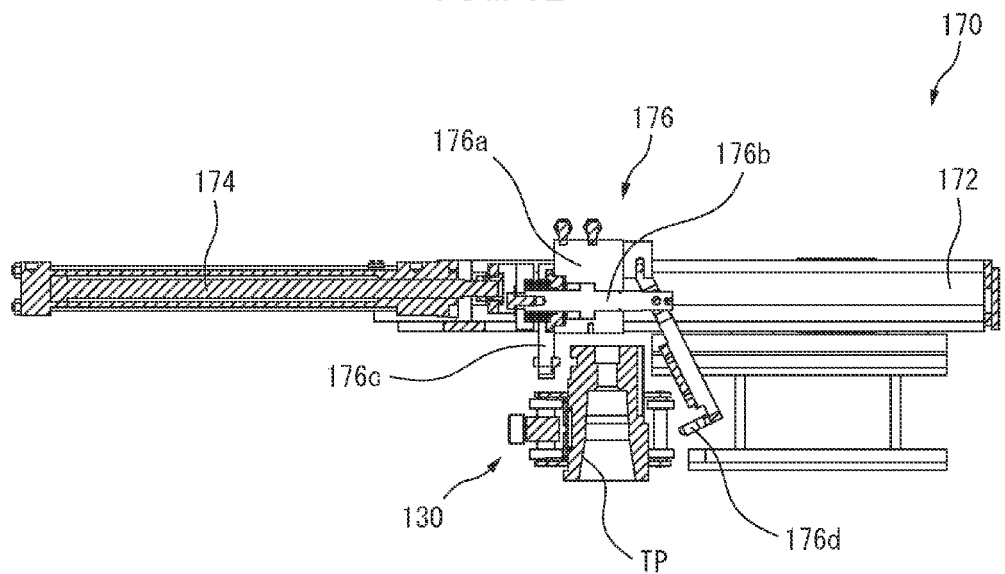
FIG. 12 is a partially sectional plan view of a shifter when it is in an unclamping state.
Figure 13:
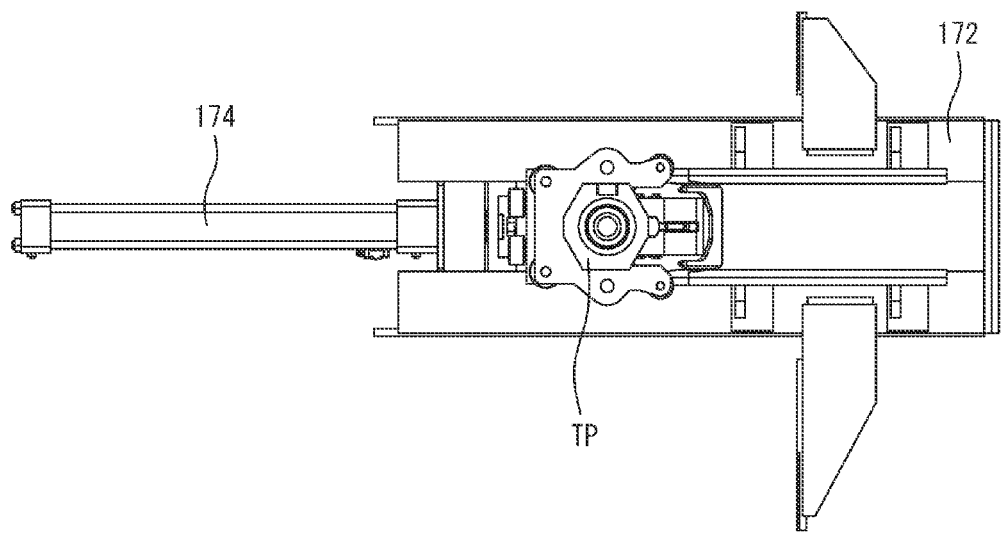
FIG. 13 is a front view of the shifter of FIG. 12.
Figure 14:
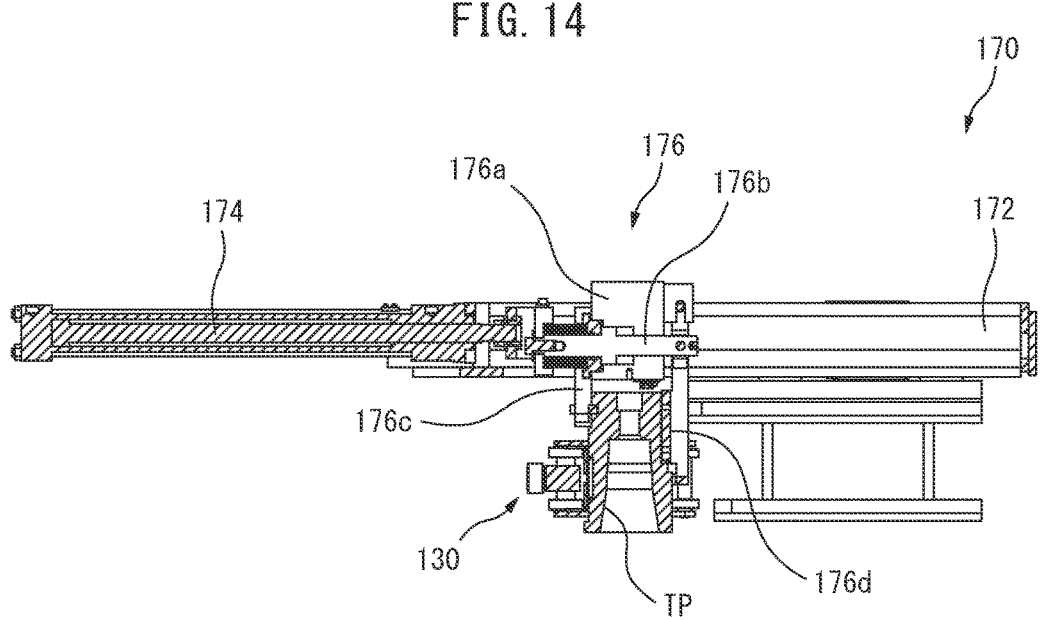
FIG. 14 is a partially sectional plan view of a shifter when it is in a clamping state.
Figure 15:
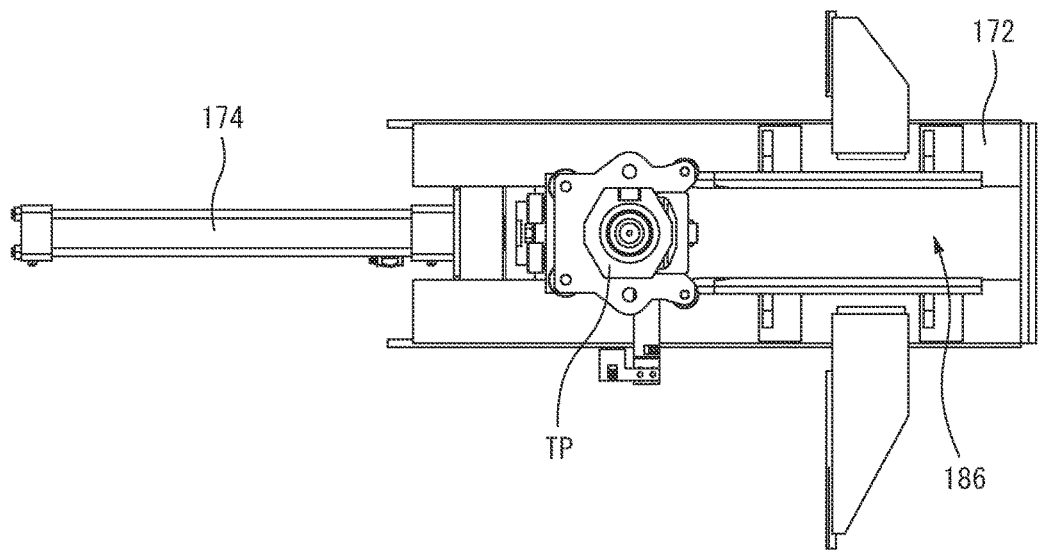
FIG. 15 is a front view of the shifter of FIG. 14.

The second link member 148 comprises two parallel link plates 150 having the same shape. The two link plates 150 are secured to each other so as to be apart from each other by pins 152. The link plates 134 are U-shaped plate members each having a base portion 150a and a pair of arm portions 150b extending from the base portion 150a. An opening 150c adapted to receive the pot TP is formed between the pair of arm portions 150b. The arm portions 150b of the link plate 150 of the second rink member 148 are shorter than the arm portions 134b of the link plate 134 of the first link member 132. The first and second link members 132 and 148 has leaf springs 156 adapted to engage pot TP whereby the pot TP is held in the openings 134c and 150c of the first and second link members 132 and 148 (FIG. 9). In particular, as understood from FIG. 6, the first and second link members 132 and 148 are connected to each other by connecting pins 154 at substantially the center in the crosswise direction of the circulating track 180. This allows the chain assembly 130 to be bend about the respective connecting ping 154 in the opposing directions.

Figure 5:
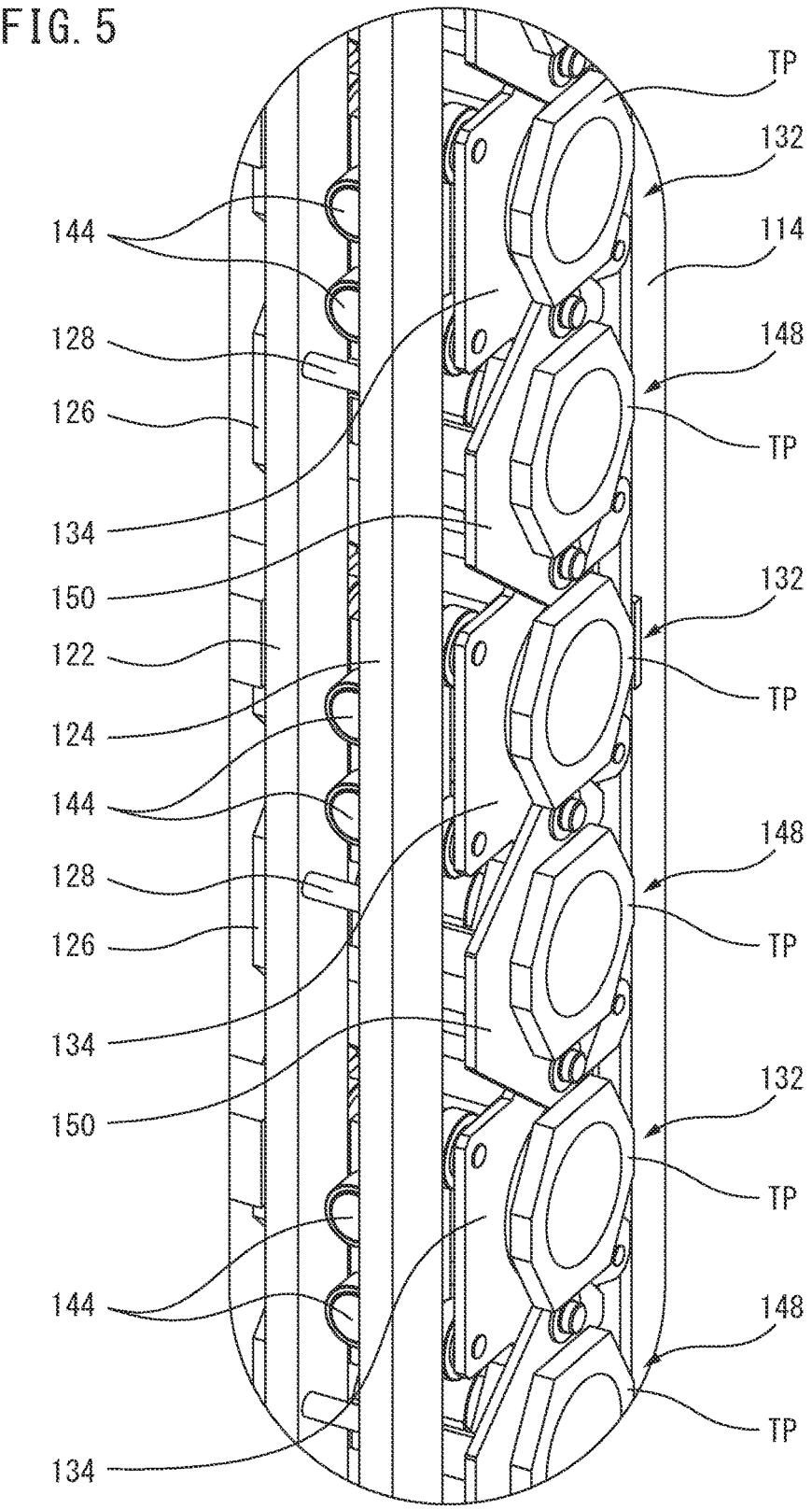
FIG. 5 is a perspective view showing portions of the chain assembly and the inner guide rail.

When the chain assembly 130 is disposed on the circulating track 180 between the outer guide rail 110 and the inner guide rail 120, the cam followers 144 of the first link members 132 are positioned between the first and second guide rails 122 and 124 of the inner guide rail 120 to contact therewith (refer to FIG. 5). The four proximal rollers 138 of the first link member 132 contact the sides of the first and second guide rails 122 and 124 of the inner guide rail 120 while the distal rollers 142 contact the sides of the first and second guide rails 112 and 114 of the outer guide rail 110. Furthermore, the first and second rink members 132 and 148 are connected to each other at a pitch so that the cam followers 144 of both the first link member 132 at the either sides of one of the second link members 148 can simultaneously engage the cam shaft 160.

Furthermore, pots TP are disposed in the openings 134c and 150c of the first and second link members 132 and 148 so that the tools (not shown) extend to the direction away from the back support part 102. The pots TP are held within the openings 134c and 150c through the engagements with the leaf springs 156.

The shifter 170 clamps a tool, along with the a pot TP fitted to the tool, held by the first rink member 132 or the second link member 148 positioned at a tool transferring position 184 defined on the circulating track 180 for the chain assembly 130 between the outer and inner guide rails 110 and 120. The shifter transfers the tool horizontally to a shifting position 186 where tools can be interchanged relative to the tool changer 24. Further, at the shifting position 186, the shifter receives from the tool changer 24 a tool held at an end of the changing arm 26 of the tool changer 24 so as to transfer it to empty one of the first or second link member 132 or 148 waiting at the tool transferring position 184.

With reference to FIGS. 12-15, the shifter 170 comprises a base plate 172 secured to the back support part 102, a shift cylinder 174 mounted to the base plate 172, and a clamper 176 connected to a piston of the shift cylinder 174. The clamper 176 comprises a clamp cylinder 176a connected to the piston of the shift cylinder 174, a clamp piston 176b mounted to the clamp cylinder 176a for sliding in the longitudinal direction of the shift cylinder 174, a fixed arm 176c fixed to the clamp cylinder 176a engageable with a side of a pot TP, a movable arm 176d, pined to the clamp piston 176b, for engaging with and disengaging from the opposite side of the pot TP. The movable arm 176d is rotatably restricted by the clamp cylinder 176a, and rotatably connected to the clamp cylinder 176a so that the end of the movable arm engages the side of the pot TP opposite to the fixed arm (FIGS. 14 and 15), and disengages from the side (FIGS. 12 and 13) when the clamp piston 176b slides relative to the clamp cylinder 176a. The end of the movable arm 176d is provided with fingers in the form of bifurcated wedges which presses and opens the leaf spring 156 when engaging the side of the pot TP, so that the pot TP is held and transferred.

Figure 16:
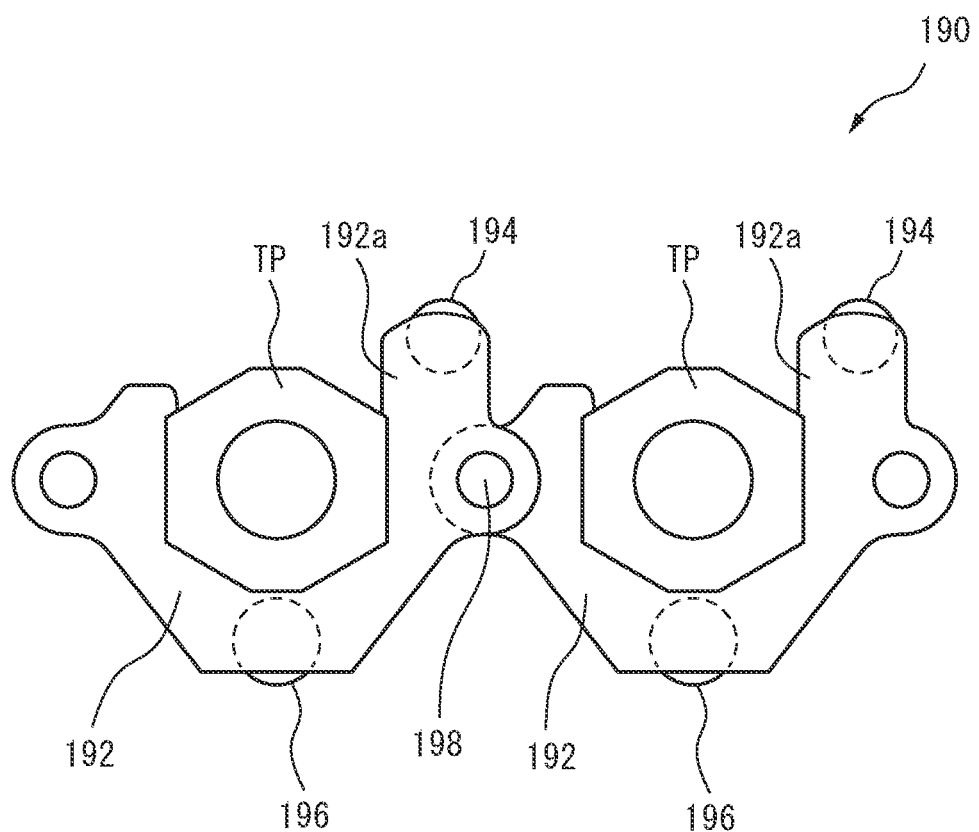
FIG. 16 is a partial front view of a variation of the chain assembly according to the first embodiment.
Figure 17:
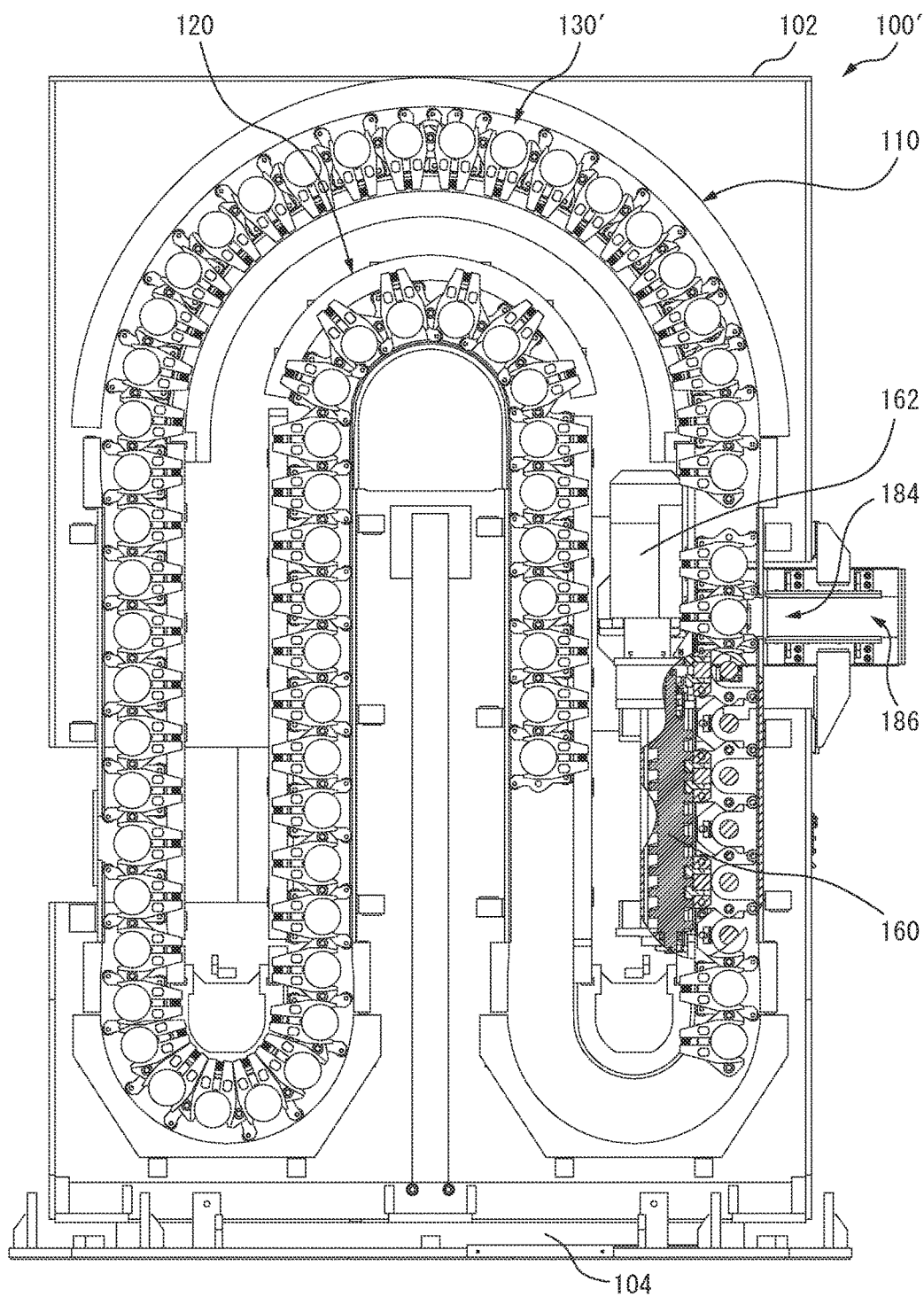
FIG. 17 is a front view of a chain-type tool magazine according to a second embodiment of the invention.

In the above described first embodiment, the chain assembly 130 has first link members 132 and the second link members 148. The invention is not limited to this configuration, the chain assembly 130 may by formed by connecting the same link members. With reference to FIG. 16, a chain assembly 190 according to a variation of the first embodiment is composed of identical link members 192 rotatably connected to each other by connecting pins 198. Each of the link members 192 comprises distal rollers 194 providing first rollers attached to the ends of arm portions 192a, and proximal rollers 196 providing second rollers mounted to the base portion.

In the invention thus formed, the chain assembly 130 bends in a direction at the large arc part 182a and the first and third small arc parts 182c and 182g of the circulating track 180, while it bends in the opposite direction at the second arc part 182e. The connecting pins 154, connecting the first and second link members 132 and 148, are positioned near the path traced by the centers of the conveyed tools, and therefore, the chain assembly can bend largely in both directions without increasing the bending radius. Accordingly, the invention provides a tool magazine, in which the chain assembly 130 can run along the serpentine track having as small curves as possible so as to store the tools at high density. The chain assembly having the openings 134c and 150c allows preparation of tools in a short time.

The configuration of the first and second link members 132 and 148 having the openings 134c and 150c, in which the first and second rollers (the distal rollers and the proximal rollers) 142 and 138 guided by the outer guide rail 110 and the inner guide rail 120 or the configuration of the first link members 132 provided with the pair of the cam followers 144 which simultaneously contact the first and second guide rails 122 and 124 allows the chain assembly 130 to run at a high speed without the chain assembly warped, without the tools inclined so that their fronts are lowered or without the tools fallen. Further, the configuration for driving the chain assembly 130 via the engagement between the cam followers 144 and the cam shaft (gear cam) 160 removes the minute variations in the running speed, which is a disadvantage involved in drives composed of sprockets and a chain, whereby the chain assembly 130 can run without vibrations.

While the part, corresponding to the large arc part 182a of the circulating track 180, is conventionally commonly formed of a horizontally extending linear part and guides, in the form of a relatively small arc, for changing the direction at a right angle at the ends of the linear part, in the invention it is formed into a large arc shape. In the conventional configuration, the stress is concentrated to the small arc guides due to the weight of the chain assembly 130 when the chain assembly 130 passes the small arc guides. Therefore, the small arc guides and the proximal rollers 138 must be made of a high rigidity material or a hardened material, increasing the cost of the chain-type tool magazine. Therefore, in the invention, the part is replaced with the large arc part 182a which removes the stress concentration, which is occurs in the conventional configuration, and eliminates the necessity of using a high rigidity or hardened material, contributing to provide a low-cost configuration. In this application, the large arc shape refers to the shape of the portion 182a connecting the maximum width of the chain assembly 130 with a smooth curvature, which does not includes a linear track portion.

The tool change between the spindle 22 and the tool magazine 100 is carried out by rotationally and reciprocally moving the changing arm 26, in the form of a well-known double arm shape, around the axis $O_{tc}$ and in the Z-axis direction after a pot TP, to which the tool to be changed is fitted, is positioned at the shift position 186 by the shifter 170, and the spindle 22 is positioned at a tool changing position 188.

With reference to FIGS. 17-24, a second embodiment of the present invention will be described below.

In the second embodiment, the elements commonly sharing with the first embodiment are indicated by the same reference numbers. A tool magazine 100' of the second embodiment has a basic structure, the same as the first embodiment, for driving an endless chain assembly 130', formed of the first and second link members 132 and 148 connected by connecting pins 154, along the outer and inner guide rails 110 and 120, by the cam shaft 160, and transferring a tool to be changed to the shift position 186 by a shifter 170 provided at the tool transferring position 184. The second embodiment differs from the first embodiment in respect that the tools are attached directly to the chain assembly 130' without using the pots TP. It should be noted that in this application, tool T includes, as well as a shank and cutter body connected to the shank, a tool holder which is fitted to the shank.

Figure 18:
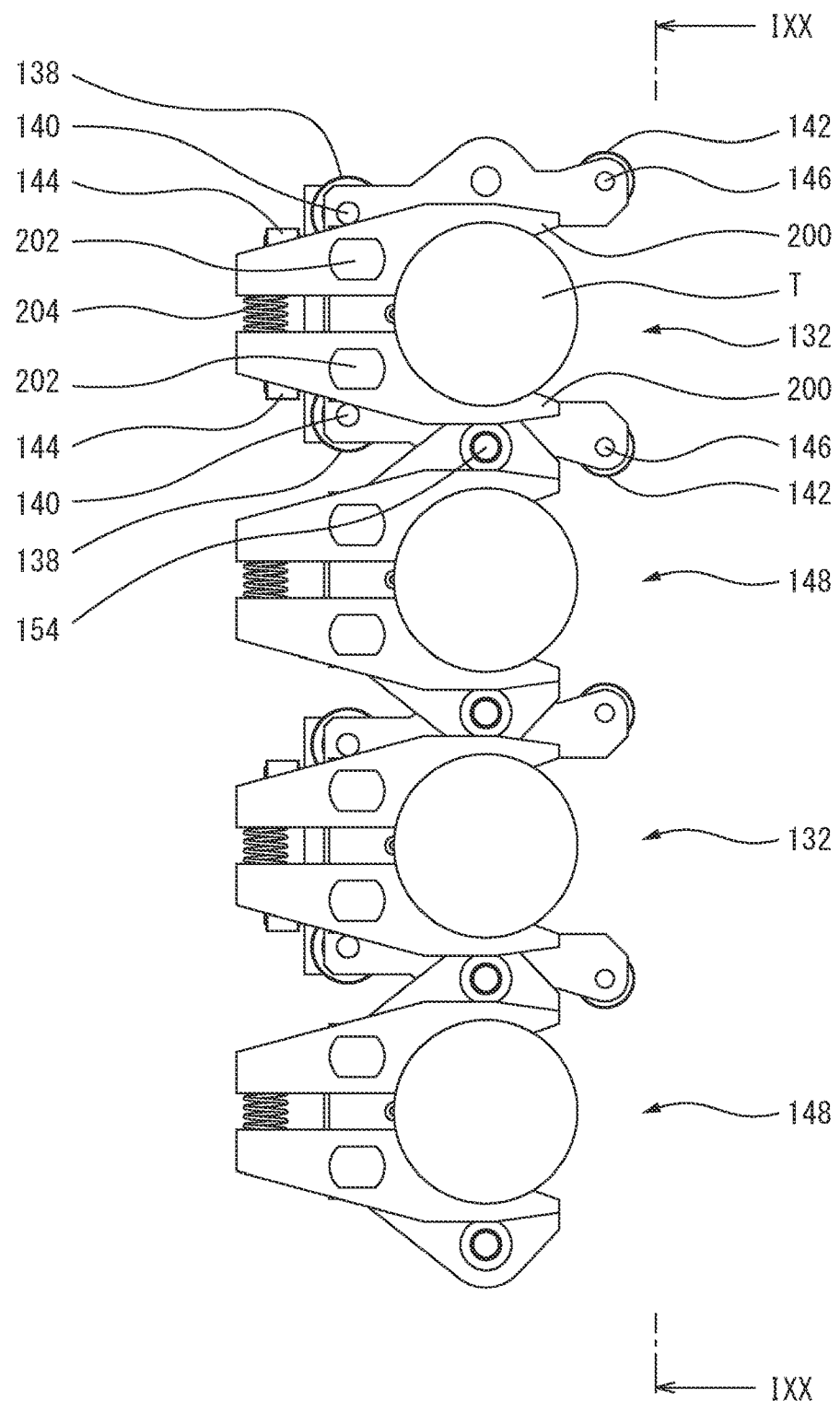
FIG. 18 is front view showing a portion of the chain assembly of FIG. 17.
Figure 19:
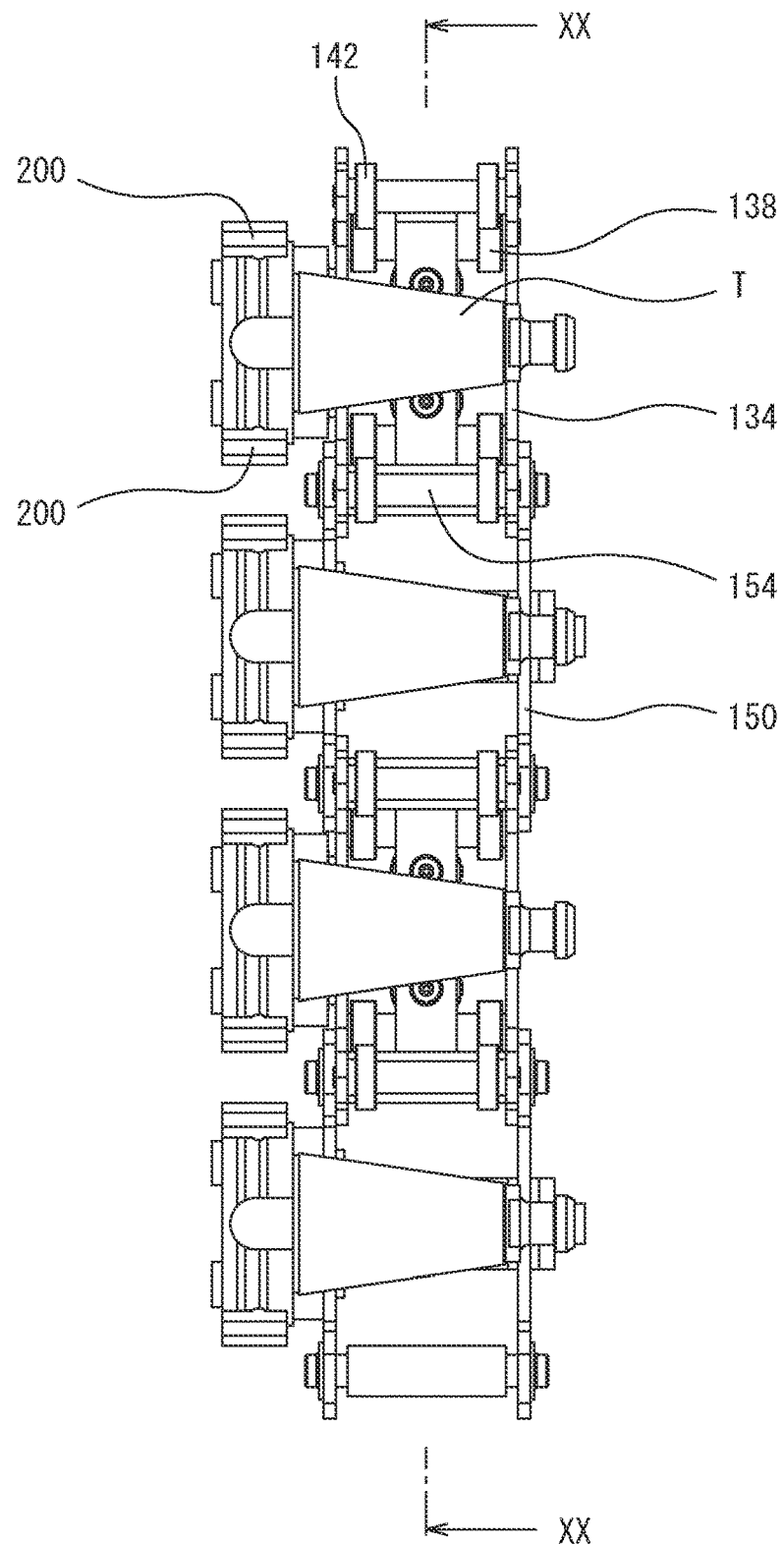
FIG. 19 is a partial side view of the chain assembly viewing in the direction of arrows IXX-IXX in FIG. 18.
Figure 20:
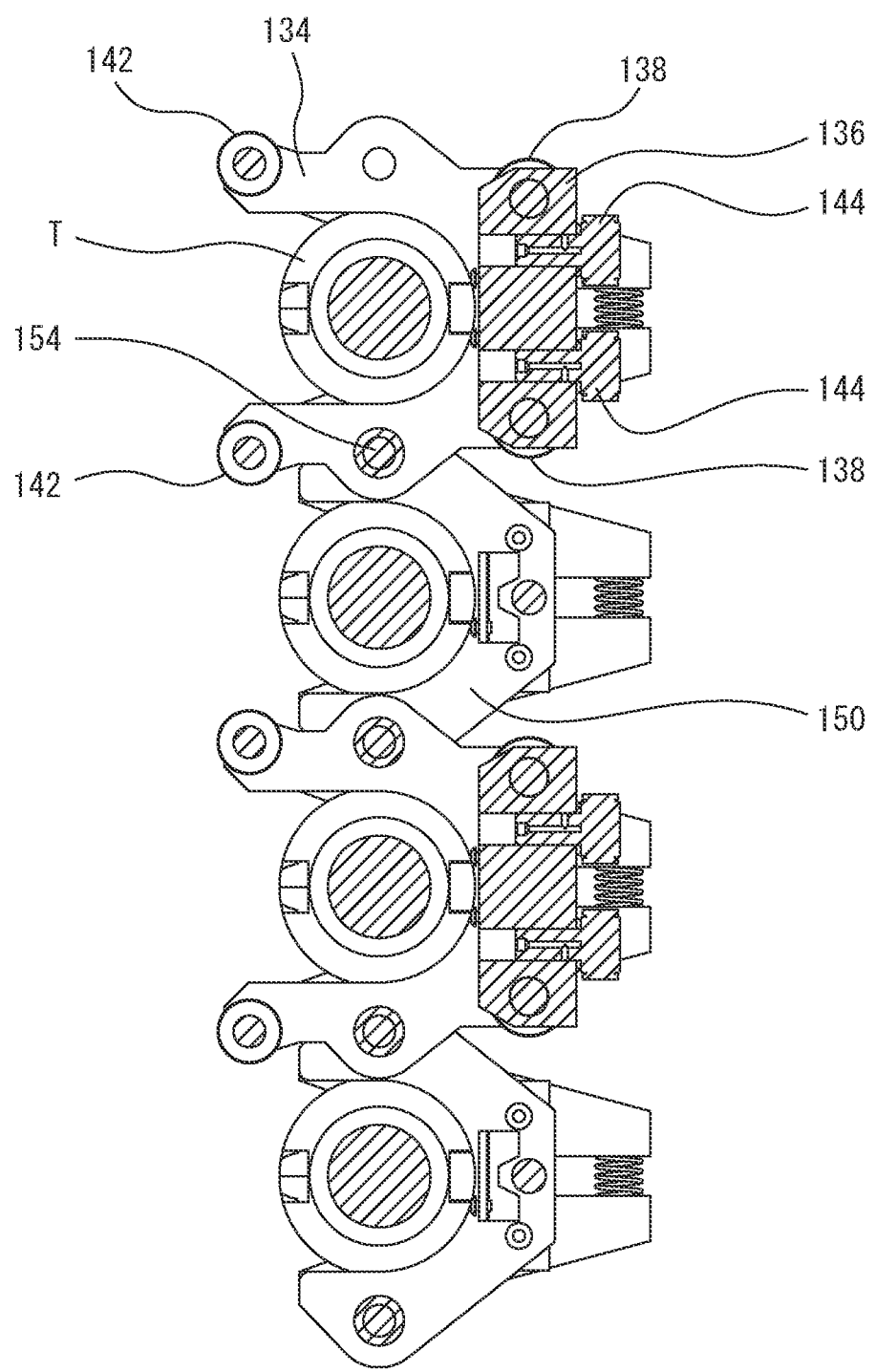
FIG. 20 is a section along line XX-XX in FIG. 19.
Figure 21:
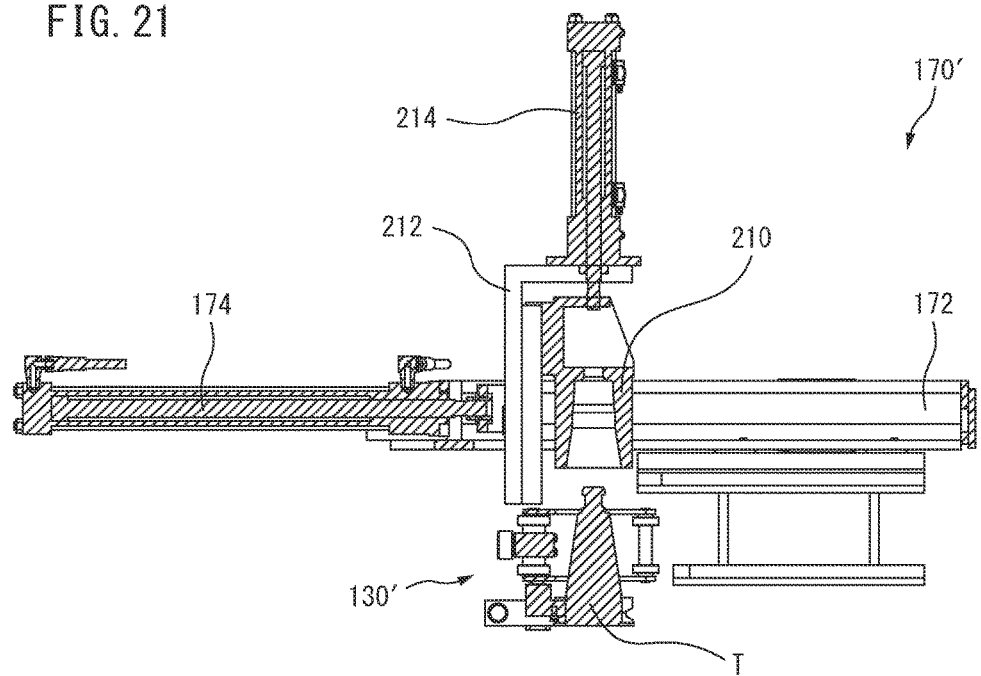
FIG. 21 is a partially sectional plan view of the shifter when it is in an unclamping state, showing along with the chain assembly of FIG. 17.
Figure 22:
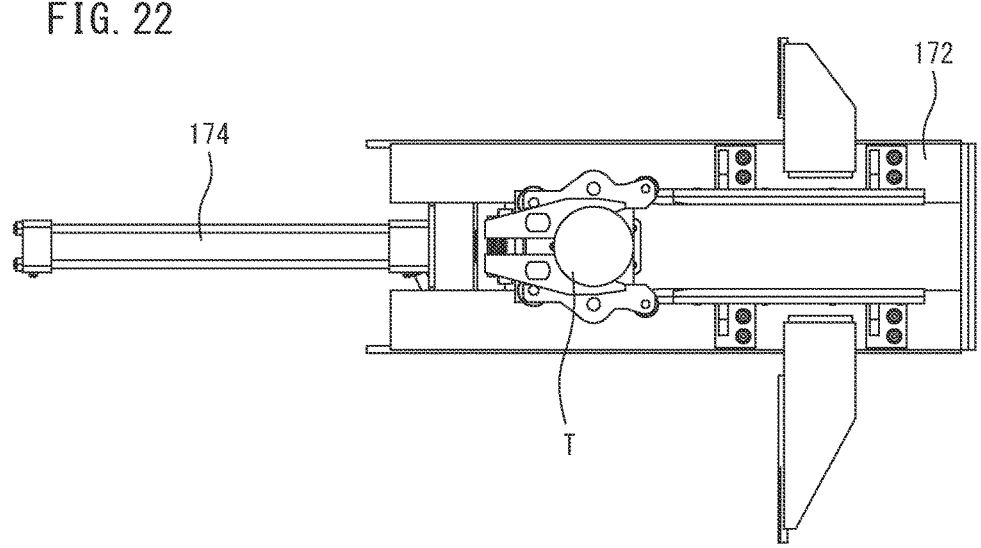
FIG. 22 is a front view of the shifter of FIG. 21.
Figure 23:
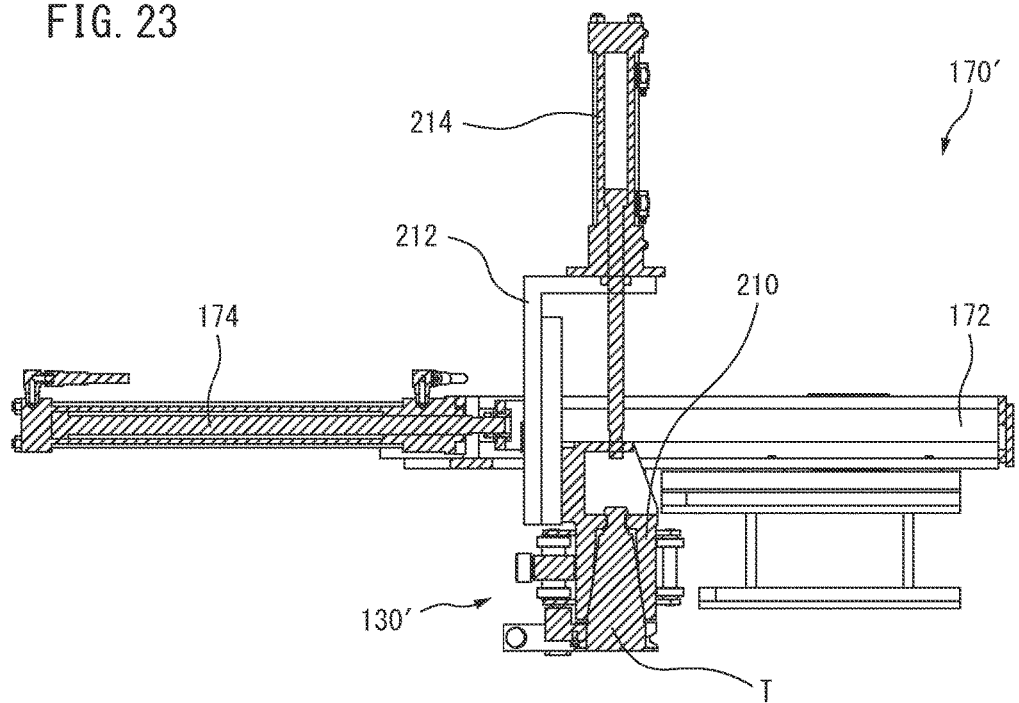
FIG. 23 is partially sectional plan view of the shifter when it is a clamping state, showing along with the chain assembly of FIG. 17.
Figure 24:
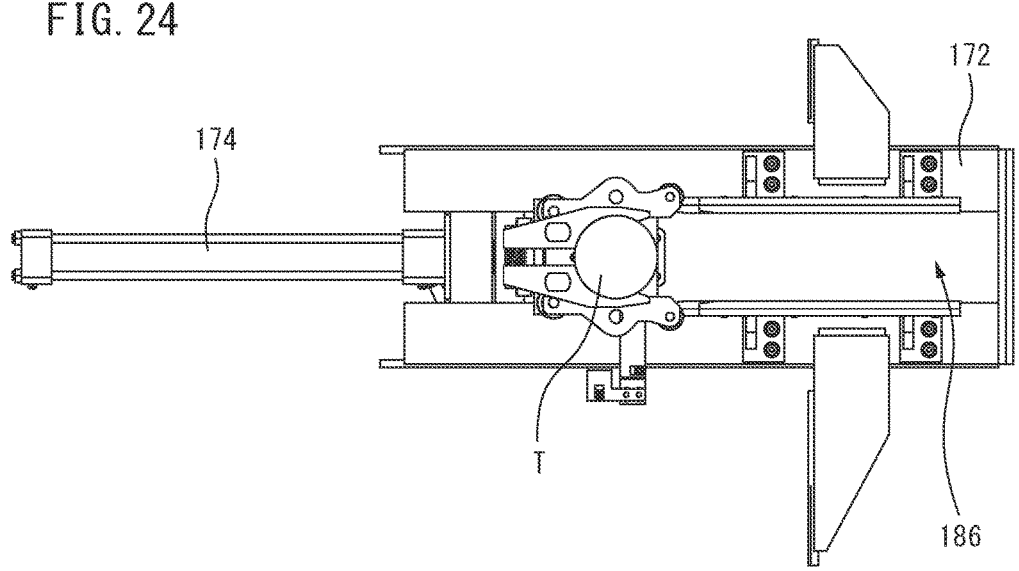
FIG. 24 is a front view of the shifter of FIG. 23.

As shown in FIGS. 18-20, a gripper for removably holding a tool T is provided. The gripper has a pair of jaws 200 mounted, by a pivot pin 202, to one of the two parallel link plates 134 and 150 disposed at the front side. The pair of jaws 200 are biased toward each other by a spring 204 whereby the gripper holds a flange portion of the tool T. The configurations of the first and second link members 132 and 148, the proximal rollers 138, the distal rollers 142, the cam followers 144 and the connecting pins 154 are the same as the first embodiment, and therefore their explanation will be omitted.

With reference to FIGS. 21-24, the shifter 170' will be described below. A tool transferring pot 210 is advanced by a cylinder 214 toward a tool T, from its shank, positioned at the tool transferring position 184, to grasp the tool T. The cylinder 214 is fixed to the piston of the shift cylinder 174 via a bracket 212 so that when the piston of the shift cylinder 174 is extended, the tool T is disengaged from the jaws 200 of the gripper against the biasing force of the spring 204 to move to the shift position 186. After tools are changed by the tool changer 24, a tool T, which has been changed, will be attached to the chain assembly 130' by the inverted process.

REFERENCE SIGNS LIST

10 Machine Tool
22 Spindle
26 Changing Arm
100, 100' Tool Magazine
110 Outer Guide Rail
120 Inner Guide Rail
130, 130' Chain Assembly
132 First Link Member
134 Link Plate
136 Block
138 Proximal Roller
142 Distal Roller
144 Cam Follower
148 Second Link Member
150 Link Plate
154 Connecting Pin
160 Cam Shaft
170, 170' Shifter
180 Circulating Track
184 Tool Transferring Position

The invention claimed is:

1. A chain-type tool magazine including a circulating chain, for removably holding a plurality of pots, to which tools are attached, or a plurality of tools, the tool magazine comprises:
    an endless chain in which a plurality of link members is linked to each other, the link members each comprising a base part, a pair of arm portions extending from the base part, at least one first roller rotatably mounted to an end of at least one of the arm portions, and a second roller mounted to the base part, the pair of arm portions of each of the link members defining an opening therebetween for removably holding a pot or a tool, a plane of the opening being aligned in a direction of a propagation of the endless chain;
    a guide for guiding the first rollers and second rollers to allow the endless chain to circulate along a serpentine track having multiple turns; and
    a driver for driving the endless chain to circulate.

2. A chain-type tool magazine including a circulating chain, for removably holding a plurality of pots, to which tools are attached, or a plurality of tools, the tool magazine comprises:
    an endless chain in which a first link member and a second link member are alternatively coupled to each other,
        the first link members comprising a base part, a pair of arm portions extending from the base part, first rollers rotatably mounted to ends of the arm portions, and a second roller mounted to the base part, the pair of arm portions of each of the first link members defining an opening therebetween for removably holding a pot or a tool, a plane of the opening being aligned in a direction of a propagation of the endless chain, and
        the second link members comprising an opening in a form of substantially a U-shape, no rollers corresponding to the first and second rollers of the first link members being provided to the second link members;
    a guide for guiding the first rollers and second rollers to allow the endless chain to circulate along a serpentine track having multiple turns; and
    a driver for driving the endless chain to circulate.

3. The chain-type tool magazine of claim 2, wherein the arm portions of the second link member are shorter than the arm portions of the first link member.

4. The chain-type tool magazine of claim 2, further comprising a shifter adapted to grasp the pot or the tool held in the opening of the first link member or the second link member so as to remove the pot or the tool from the first link member or the second link member to transfer it outside the chain-type tool magazine, and to grasp the pot or the tool outside the tool magazine to transfer it inside the chain-type tool magazine so as to attach the pot or the tool to empty one of the first or second link member.

5. The chain-type tool magazine of claim 1, wherein the guide comprises a outer guide rail and an inner guide rail, the outer and inner guide rails extending parallel to each other by a predetermined distance so as to define therebetween a circulating track in the form of generally an inversed U-shape.

6. The chain-type tool magazine of claim 5 wherein the first rollers engage the outer guide rail and the second rollers engage the inner guide rail.

7. The chain-type tool magazine of claim 2, wherein the driver comprises a cam shaft in a form of a screw extending along the circulating chain, and a motor for rationally driving the cam shaft, wherein the first link member is provided with a cam follower, disposed on the base part, for engaging the cam shaft.

8. The chain-type tool magazine of claim 7, wherein when the cam follower does not engage the cam shaft, the cam follower engages an inner guide rail of the guide, the second rollers engaging the inner guide rail.

9. The chain-type tool magazine of claim 2, wherein the guide comprises a outer guide rail and an inner guide rail, the outer and inner guide rails extending parallel to each other by a predetermined distance so as to define therebetween a circulating track in the form of generally an inversed U-shape.

* * * * *